July 29, 1952    J. F. GANTT    2,605,162
FILM OPAQUING DEVICE AND PROCESS
Filed July 27, 1949
FIG. 1
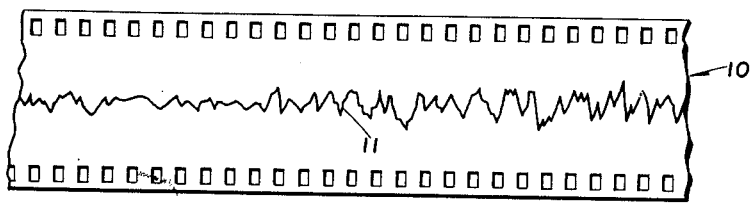
FIG. 2
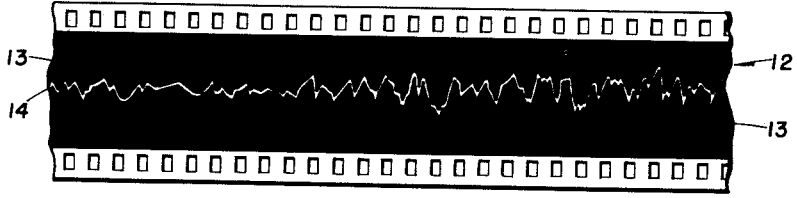
FIG. 3
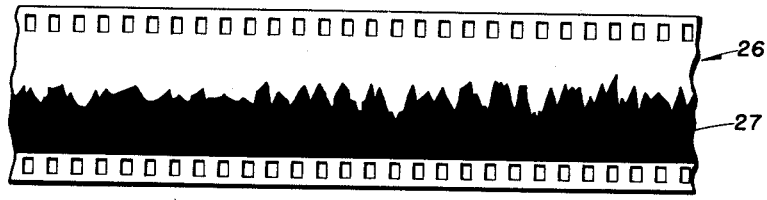
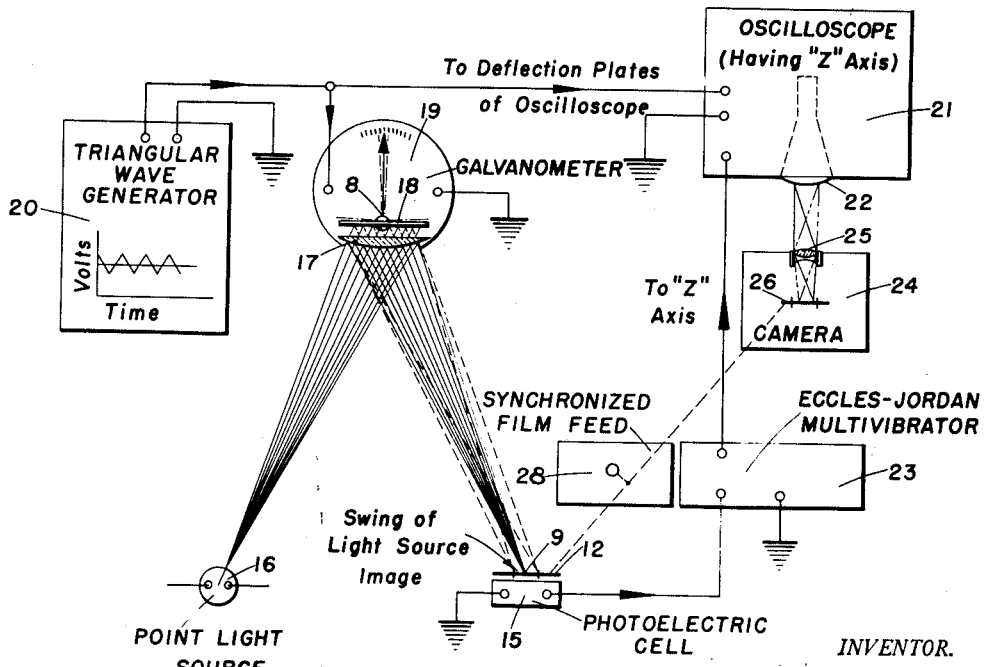
FIG. 4
INVENTOR.
JOHN F. GANTT
BY
ATTORNEY Patented July 29, 1952

2,605,162

UNITED STATES PATENT OFFICE 2,605,162

FILM OPAQUING DEVICE AND PROCESS

John F. Gantt, Vienna, Va., assignor to the United States of America as represented by the Secretary of the Navy Application July 27, 1949, Serial No. 107,031

9 Claims. (Cl. 346—110)

The present invention relates, in general, to trace reproduction, and more particularly to a process and apparatus for converting a record trace, in the form of a line, into a record consisting of interfitting wholly light and wholly dark areal portions, which when thus fitted together have the original trace as their common boundary.

More particularly, it relates to such process and apparatus wherein the original record is a continuous undulatory line extending along a motion picture film, said line being either black or transparent respectively, in the negative or positive film, and wherein the resultant is a film having extensive opaque and transparent portions, corresponding to said original record.

Heretofore, when such records were required, the practice was to make a photographic print, on opaque paper, from an original film negative, and to cut this longitudinally along the trace with scissors. Such procedure was very laborious and time consuming, and was subject to inaccuracies due to failure of the scissors to follow exactly along the trace.

An object of the invention, therefore, is to provide an improved process and apparatus for making such records.

More specifically, an object is to provide automatic, electronically and optically actuated devices and circuits for converting such line traces into areal opaque and transparent records.

Other objects and many of the attendant advantages of this invention will be appreciated readily as the same becomes understood by reference to the following detailed description, when considered in connection with the accompanying drawings, wherein:

Fig. 1 is a representation of a fragment of a film negative, showing the trace as a black line;

Fig. 2 is the corresponding positive, wherein the trace appears as a transparent line;

Fig. 3 is the corresponding half-transparent and half-black resultant film produced by the process and apparatus of the present invention; and Fig. 4 is a block-diagram of an apparatus and circuit that may be used in the process of thus converting the film record.

Film records of the type shown in Fig. 1 are obtained directly as a result of tests of projectiles, equipped with radio transmitters, whereby signals received from the projectiles during their flight actuate suitable photographic equipment at a receiving station. These records as at present utilized are not immediately useful but must first be reconverted into electrical signals, in the form of a variable voltage.

The new procedure, which supersedes the "hand-cutting" procedure formerly used, is entirely automatic, and yields a photographically-exact copy, without requiring the services of an operator, once it has been started properly.

Referring first to Fig. 1, the film negative 10 is shown with an irregularly undulating line or trace 11 thereon. As this trace is produced by a moving spot of light striking the likewise moving photographic film, the trace is a dark or opaque line 11, on the original negative.

Fig. 2 shows a positive film 12 made from negative 10, as by printing photographically, and depicting the same trace, which now appears as a transparent line 14 on a black or opaque background 13.

This positive film 12 is next fed through the converter shown in Fig. 4. There said film passes over a photoelectric cell 15, with a uniform motion, at right angles to the plane of the drawing.

While the film is so traveling, a spot of light 9 continually oscillates or sweeps completely across the latter, in the plane of the drawing, so that in its every excursion in either direction this spot passes the transparent trace 14, and thus illuminates the photoelectric cell for a brief time interval, thereby providing a corresponding photoelectric current pulse.

The light originates in a steady "point" source 16, shown as a small electric lamp, which may be of the zirconium-arc type, whence a divergent pencil of rays passes to a collimating lens 17, which produces substantially parallel rays from said divergent pencil. These parallel rays strike the plane mirror 18 which reflects them back through the lens 17, whereby said parallel rays become converted into a convergent pencil, which forms the image 9 of the light source in the plane of the positive film 12, said image being the spot of light, already mentioned.

The mirror 18 is caused to oscillate at a suitable frequency in any way, for example, by means of the moving system 8 of a galvanometer 19, to which are fed the voltage pulses from a conventional triangular-wave generator 20. These pulses are fed also to one pair of the deflecting plates of an oscilloscope 21 and produce corresponding traces on the fluorescent screen 22 thereof.

It is evident that, if preferred, the older type of conventional galvanometer movement, that incorporates its own concave mirror, may replace the present combined lens and mirror, at the expense of having somewhat increased inertia in the moving system.

The photo-electric impulses are supplied to a conventional Eccles-Jordan multivibrator 23, with the result that each pulse "reverses" the said multivibrator. An Eccles-Jordan multivibrator, briefly, comprises essentially two electronic tubes so interconnected that any increase in the anode current of either tube grows cumulatively until said tube takes the entire current and the anode current of the other tube drops to zero. The same effect, in reverse, will then shift the entire current in turn to the other tube, and so on, whenever the anode current of one tube or the other is initially increased by any external electrical pulse. The output of said multivibrator therefore consists, in the present case, of alternate pulses of high and low voltage, such as the positive and negative halves of so-called "square" waves, forming thus two "sets," which are fed to the "Z"-axis of the oscilloscope 21. This Z-axis, it may be desirable to explain, is merely a circuit that bias-modulates the intensity of the cathode beam, and in the present case is preferably so adjusted that the beam is reduced substantially to zero intensity during one set of such pulses, while it remains at full intensity during the other, opposite set.

Consequently, whenever the spot of light 9 is on one side of the transparent trace on film 12, the cathode beam is on, whereas said beam is substantially extinguished when said spot is on the other side of said trace. Stated a little differently, each time the spot of light crosses the transparent trace, it causes a change in the cathode beam, from on to off, or from off to on, every such condition then continuing until the next crossing of the trace.

A camera 24, including the lens 25, serves to focus an image of the luminous trace appearing on the oscilloscope screen 22 on the sensitive photographic film 26, which is caused to feed along in synchronism with the film 12, by the common feed mechanism 28. Thus the film 26, when developed, will have the appearance indicated in Fig. 3, that is, it will have a wholly dark portion 27 at one side of the trace, and a wholly transparent one at the other side thereof.

The resulting film 26, containing the areal record, may be used directly with the aid of photoelectric means, to produce a voltage representing that of the signals that were originally recorded on the negative 10 as the trace 11, and the variations of this voltage may then be used to study the flight conditions of the projectile.

While the procedure has been disclosed as involving the making of a positive print 12 from the original negative 10, and while this constitutes the procedure at present preferred, it is to be understood that it is by no means necessary to provide such positive copy. The convenience of the preferred process resides in the fact that it is far easier and simpler to admit a light beam through a narrow transparent slit, such as the trace 14 of Fig. 2, than to shut off a light beam with certainty by means of the narrow opaque trace 11 of Fig. 1, for the reason that slight variations in the size of the light-image, or in the opacity and/or width of the trace 11, might readily cause failure of adequate response of the photoelectric cell 15, and would then produce erratic final results. Hence, while it would not be difficult to construct the apparatus to work directly from the original negative, and such apparatus and operation are clearly within the spirit and scope of the invention, at present it seems preferable to include the making of a positive copy as a step of the process.

Obviously many other modifications and variations of the present invention are possible in the light of the above teachings. It is therefore to be understood that within the scope of the appended claims the invention may be practised otherwise than as specifically described.

What is claimed is:

1. In apparatus for photographically converting a line trace of a function into a corresponding areal representation of said function, from a carrier bearing said trace, a camera for holding a photographically-sensitive element for receiving said areal representation, means for optically scanning said carrier across the trace, photoelectric means coacting with said scanning means to produce electrical impulses from said trace, means for producing alternately high and low voltage pulses from successive impulses, and means whereby said pulses are transformed into light pulses, said light pulses being correspondingly alternately intense and weak, and being received by the camera and producing the areal image therein.

2. In apparatus for photographically converting a line trace of a function into a corresponding areal representation of said function, from a carrier bearing said trace, a camera for holding a photographically-sensitive element for receiving said areal representation, means for optically scanning said carrier across the trace, photoelectric means coacting with said scanning means to produce electrical impulses, means for producing alternately high and low voltage pulses from said electrical impulses, and an oscilloscope energized by said pulses to provide luminous traces of alternately high and low luminous intensity corresponding thereto, said luminous traces being photographed by said camera to produce a developable areal image on the photographically-sensitive element.

3. In the apparatus defined in claim 2, additionally, means for feeding the photographically-sensitive element synchronously with the carrier.

4. In the apparatus defined in claim 2, additionally, means for synchronizing the optical scanning with the sweep of the oscilloscope.

5. In the apparatus defined in claim 2, additionally, means for synchronizing the optical scanning with the sweep of the oscilloscope, and means for feeding the photographically-sensitive element synchronously with the carrier.

6. The process of converting a carrier-supported trace of a function into a corresponding areal representation of said function, which comprises feeding said carrier in the direction of its length, modifying a light beam by sweeping it continuously across said carrier in alternate directions, translating said modifications into electrical pulses alternately of high and low voltage, converting said electrical pulses into corresponding light pulses, feeding a photographically-sensitive carrier synchronously with the first-named carrier and sweeping said light pulses continuously to and fro across said second carrier, thereby producing a developable photographic image on said second carrier.

7. The process of converting a carrier-supported transparent trace of a function into a corresponding areal representation of said function, which comprises moving said carrier with respect to a light beam, modifying the said light beam by sweeping it continuously across said carrier, to produce a series of light pulses that are very short in comparison with the dark intervals therebetween, translating said light pulses into electrical pulses all of the same order of length but alternately of high and low voltage, converting said electrical pulses into corresponding light pulses, feeding a photographically-sensitive carrier synchronously with the first-named carrier, and sweeping said second-named light pulses continuously across said second carrier, thereby producing a developable photographic image on said second carrier.

8. The process of converting a carrier-supported transparent trace of a function into a corresponding areal representation of said function, which comprises feeding said carrier in the direction of its length, repeatedly interrupting a light beam by sweeping it continuously across said carrier in alternate directions, to produce a series of light pulses that are very short in comparison with the dark intervals therebetween, translating said light pulses into electrical pulses all of the same order of length but alternately of high and low voltage, converting said electrical pulses into corresponding light pulses, feeding a photographically-sensitive carrier synchronously with the first-named carrier and sweeping said second-named light pulses continuously across said second carrier, thereby producing a developable photographic image on said second carrier.

9. In apparatus for converting a line trace of a function into a corresponding areal representation of said function, a source of triangular electrical waves, an oscilloscope having a Z-axis, a galvanometer movement, connections between said source, said movement, and one pair of deflection plates of said oscilloscope, whereby a rectilinear luminous sweep is produced on the fluorescent screen of the oscilloscope and simultaneously the galvanometer movement executes deflections synchronized with said sweep, a point source of light, a reflector carried by said galvanometer movement, a photoelectric device, means for interposing between said reflector and said device a record strip containing the line trace to be converted, the light source, reflector, and photoelectric device being so arranged that the reflector casts an image of the light source on said strip, the line trace differing in translucidity from the remainder of the record strip, whereby variation in the light intensity received by the photoelectric device occurs whenever the image crosses said trace, thus generating electric pulses, a triggering circuit actuated by said pulses and producing alternate pulses of high and low voltage, a circuit connecting said triggering circuit to said Z-axis to produce corresponding intensity variations in the luminous sweep, a camera for receiving a photographically-sensitive element therein, and focused on said sweep, and means for moving said element synchronously with said record strip.

JOHN F. GANTT.

REFERENCES CITED

The following references are of record in the file of this patent:

UNITED STATES PATENTS

| Number | Name | Date |
|---|---|---|
| 2,093,539 | Blaney | Sept. 21, 1937 |
| 2,485,829 | Holst et al. | Oct. 25, 1949 |